Aug. 9, 1949.
C. D. THOMS
APPARATUS FOR CHARGING LIQUIDS
WITH GAS UNDER PRESSURE
2,478,212
Filed Aug. 4, 1945
6 Sheets-Sheet 1
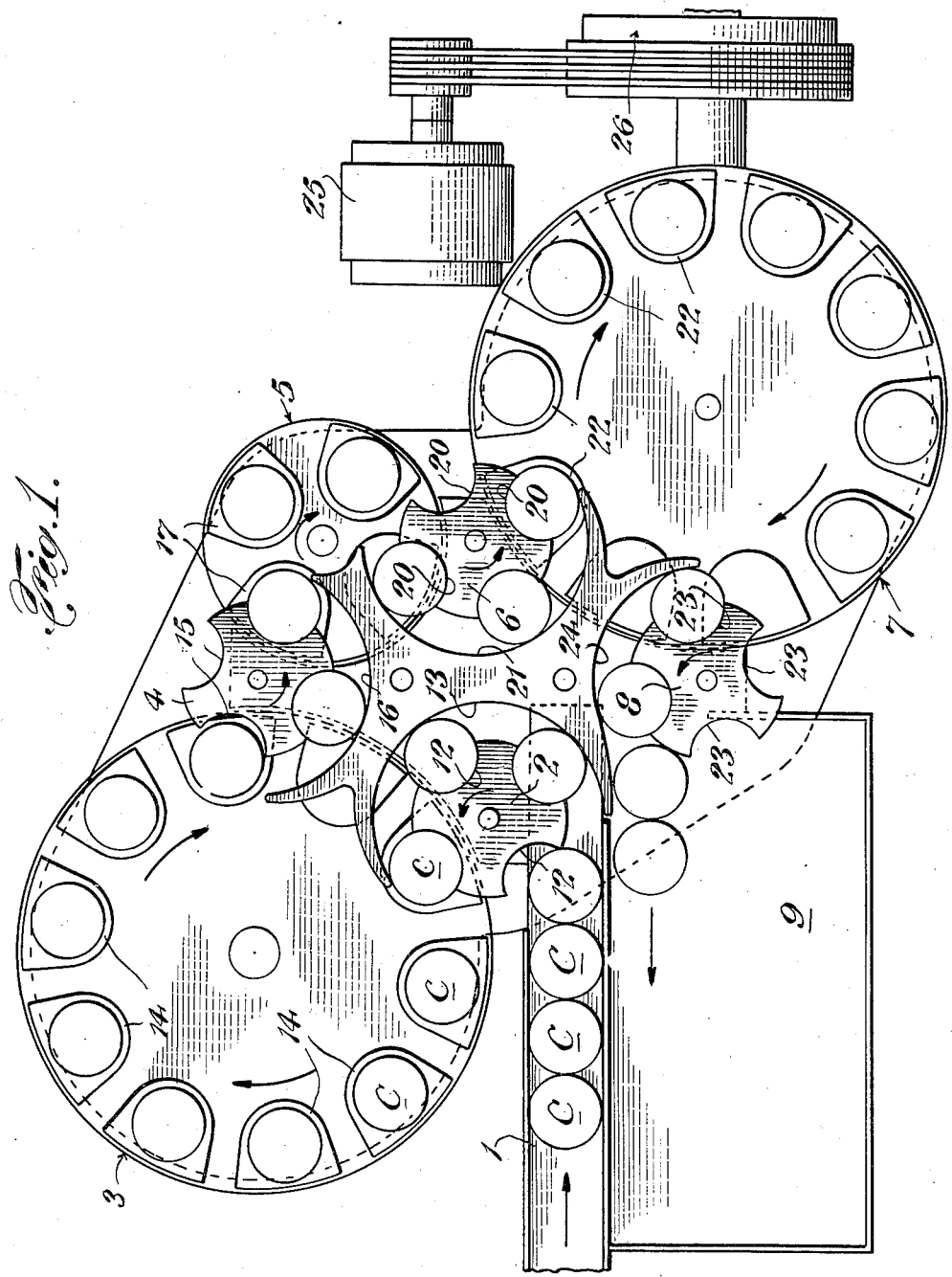
INVENTOR
CHARLES D. THOMS
BY
ATTORNEYS

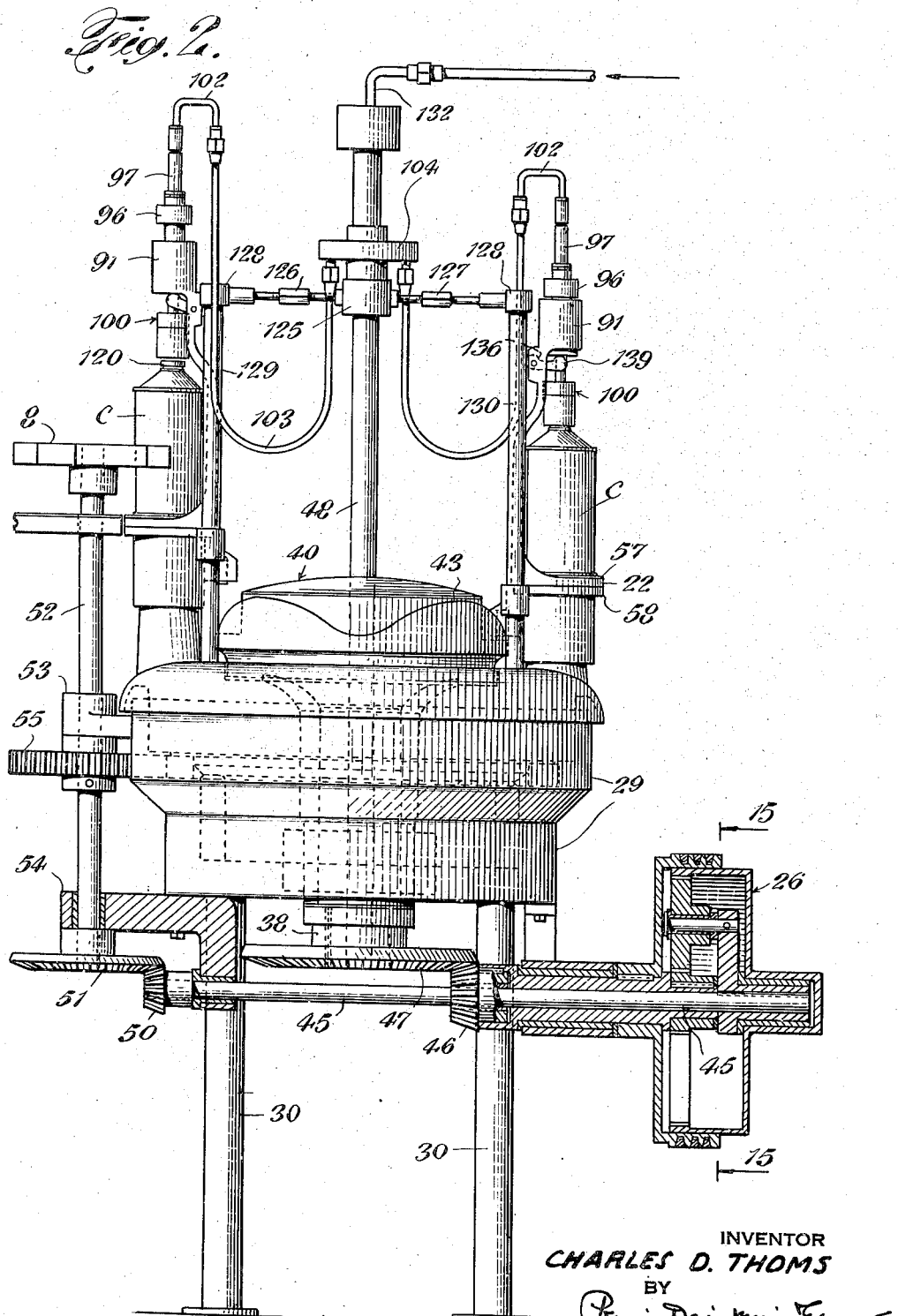

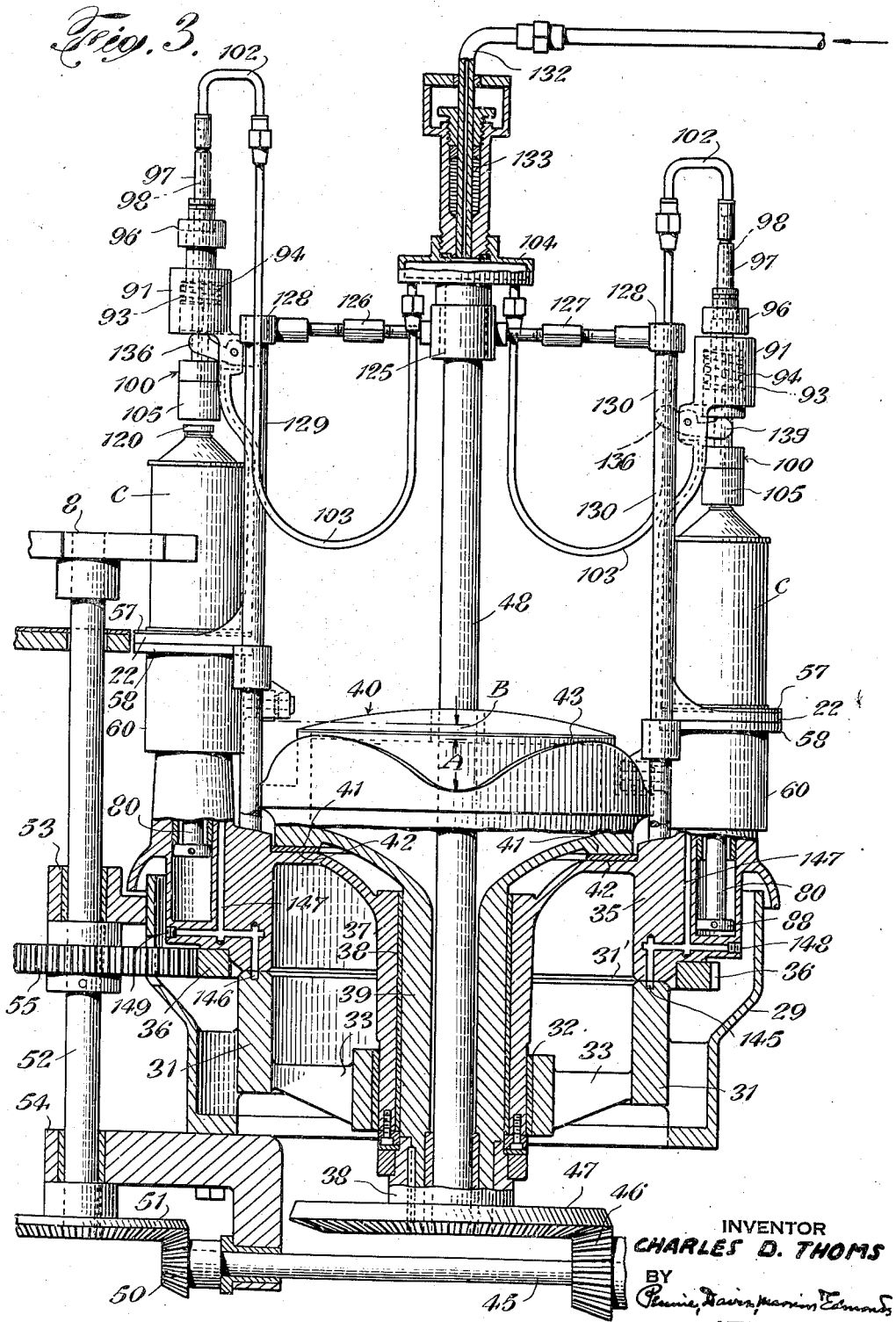

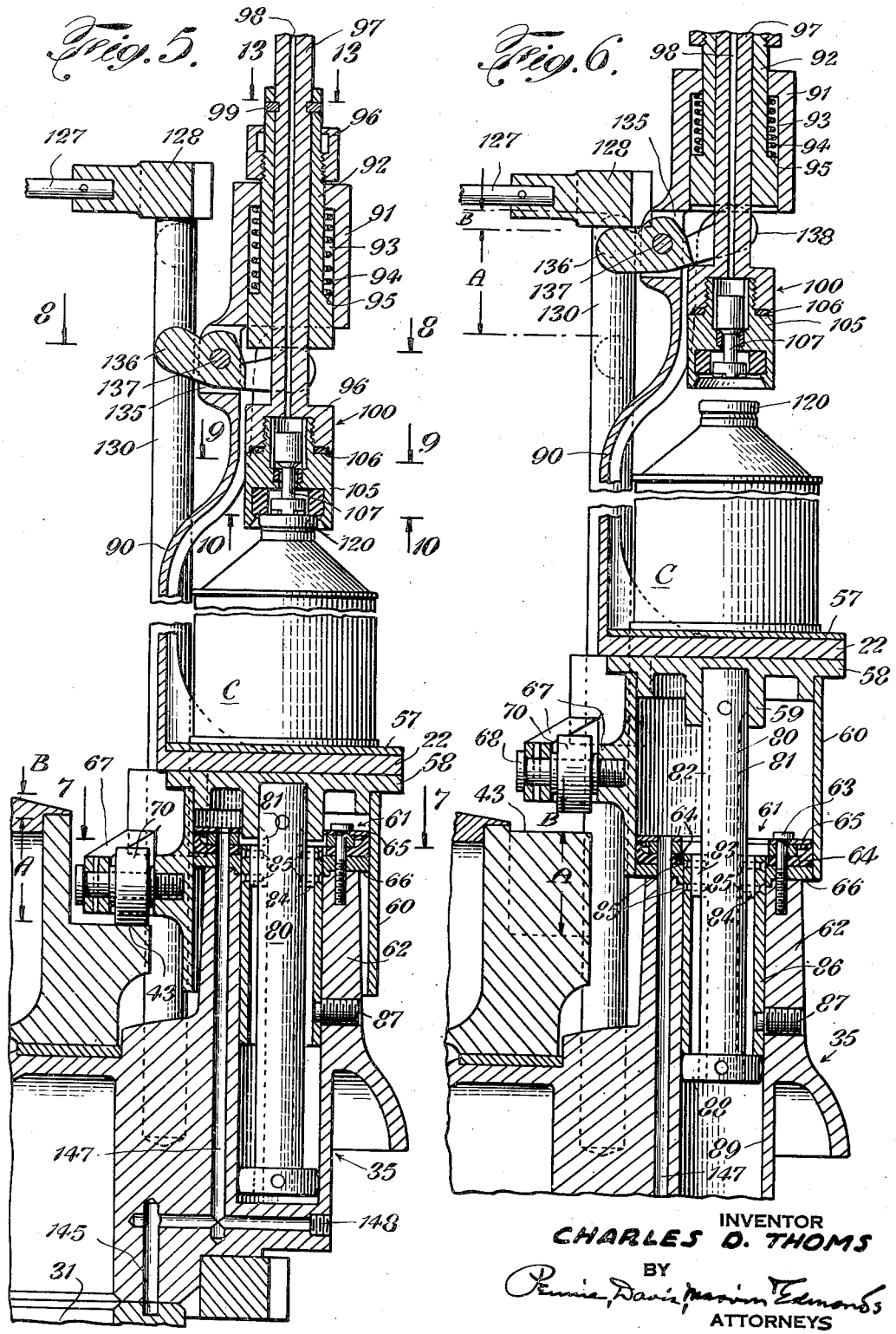

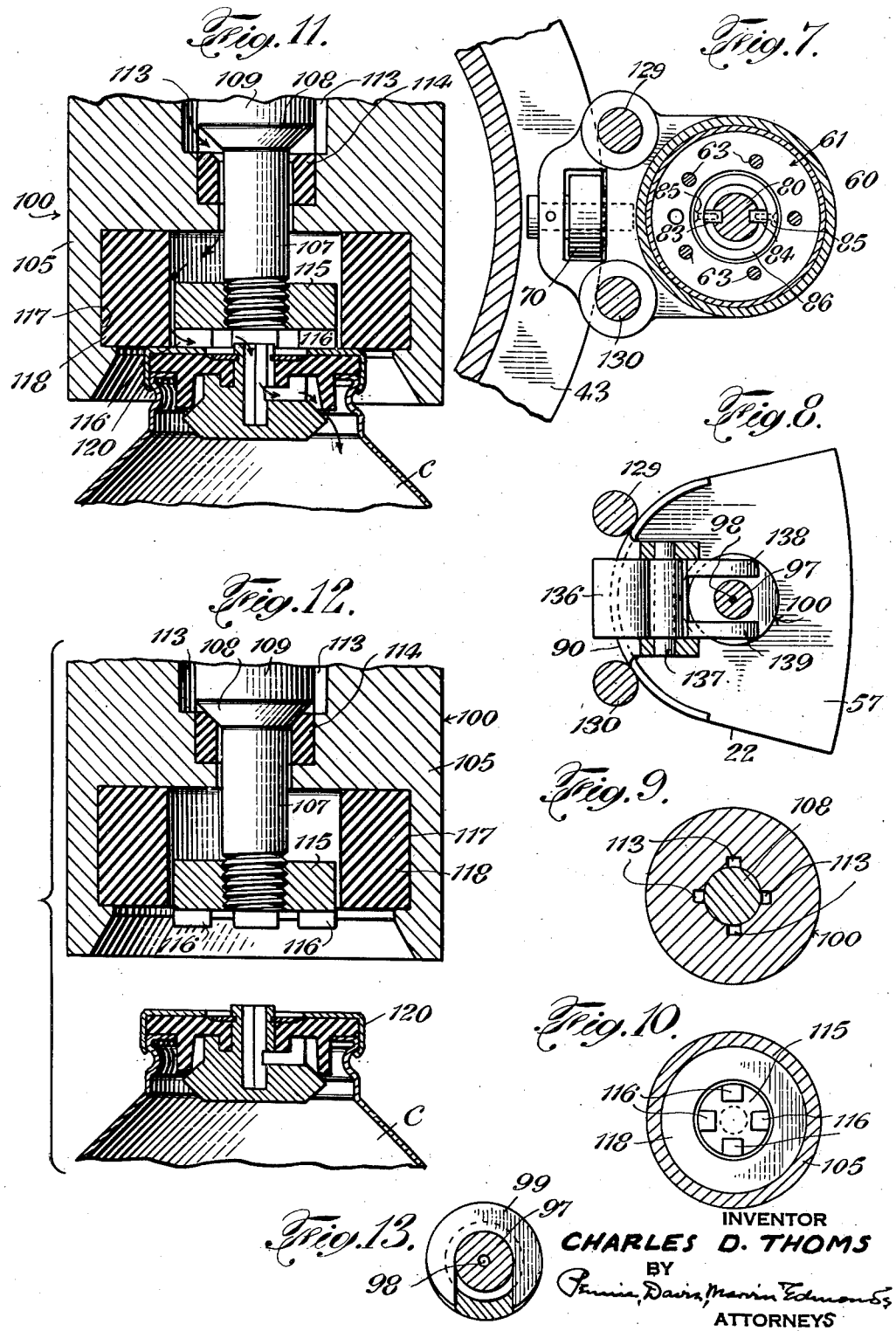

INVENTOR
CHARLES D. THOMS
BY
ATTORNEYS

Patented Aug. 9, 1949

2,478,212

UNITED STATES PATENT OFFICE 2,478,212

APPARATUS FOR CHARGING LIQUIDS WITH GAS UNDER PRESSURE

Charles D. Thoms, New York, N. Y.

Application August 4, 1945, Serial No. 608,889

5 Claims. (Cl. 226—72)

1

This invention relates to the charging of liquids with gas under pressure and has for its object the provision of an improved apparatus for this purpose. In the charging of various liquids, such as beverages, cream and the like, with gases, such as carbon dioxide, nitrous oxide, etc., it is important to agitate the liquid while introducing the gas to effect an efficient solution of the gas in the liquid. The apparatus of the invention is concerned with the charging of gas into a liquid while in a container and provides an improved means for agitating the liquid in the container while the gas is being introduced into the liquid under pressure.

The invention provides an automatically operated apparatus for filling individual small containers, such as cans, bottles or the like, with a liquid, for example cream, charging a gas, for example nitrous oxide, into the container, and an improved means for agitating the cream while the nitrous oxide gas is being introduced into the cream under pressure. In one of its advantageous embodiments, the invention provides an undulating cam race with engaging cam members for actuating the containers, together with means for introducing the gas into the container, thereby charging gas into the liquid while agitation is effected in a succession of short up and down strokes of the containers.

In its more complete embodiment, the invention comprises a composite or integrated apparatus including automatic means for filling the containers with liquid, means for attaching a special cap with valve, or filling head, and means for passing the capped containers in a continuous seriate order to and through the gas charging and agitating means to the place of delivery. One of the important features of the invention is the means for moving the containers in a succession of short up and down strokes to agitate the liquid while means are attached to the cap of the container to introduce the gas. The containers are moved along their longitudinal axes without side motion and the tendency for leaks to develop where the gas filling means are attached to the cap is greatly minimized.

These and other novel features of the invention will be better understood after considering the following discussion when taken in conjunction with the accompanying drawings, in which:

Fig. 1 is a diagrammatic illustration, in plan, of an arrangement of apparatus embodying the invention;

Fig. 2 is a side elevational view, with parts in section, of the gasser;

2

Figure 4:
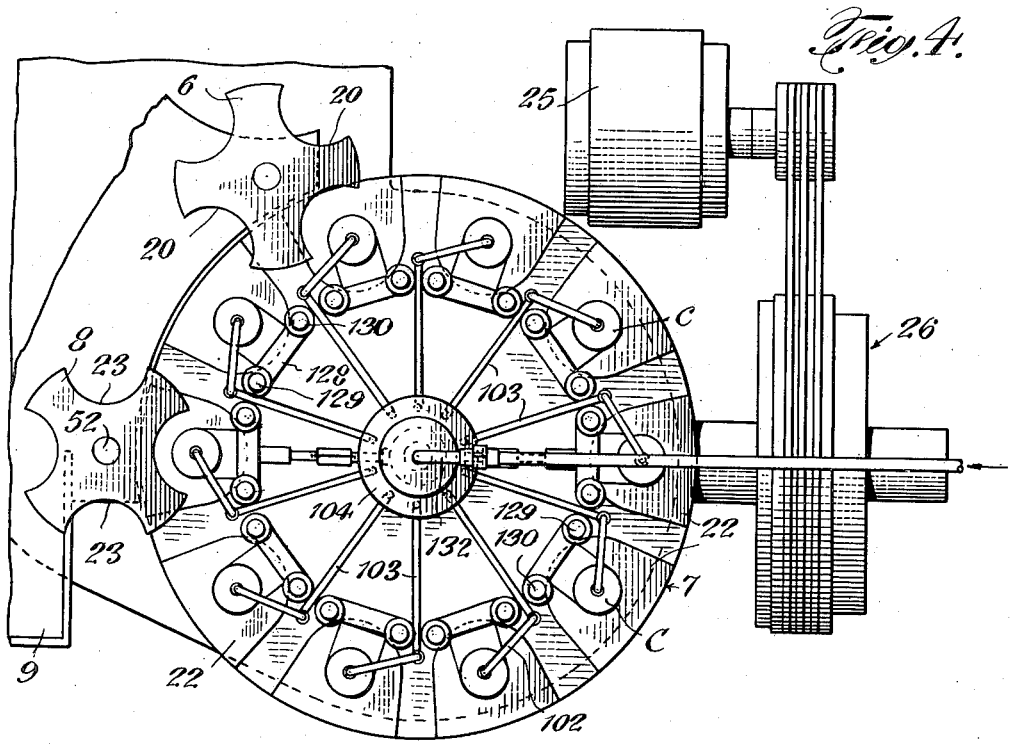
Figure 14:
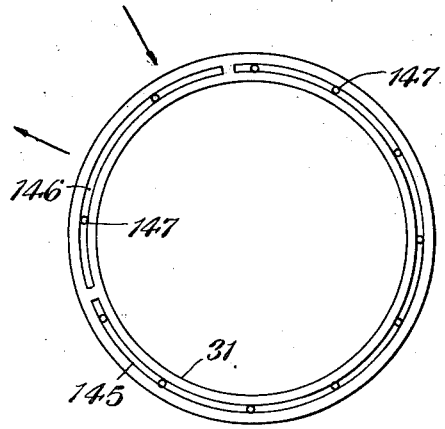
Figure 15:
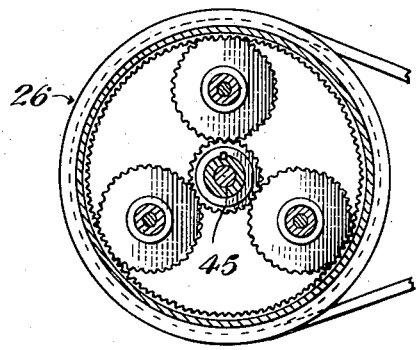

Fig. 3 is an enlarged side elevational view, with parts in section, of the upper portion of the gasser;

Fig. 4 is a plan view of the gasser and immediately connected parts;

Fig. 5 is a sectional elevational view of a part of the gasser;

Fig. 6 is a sectional elevational view similar to that of Fig. 5 showing the parts in a different position;

Figs. 7, 8, 9 and 10 are sectional views along lines 7—7, 8—8, 9—9, and 10—10, respectively, of Fig. 5;

Fig. 11 is an enlarged sectional view of the valve-controlled gas-filling assembly showing the valve in its open position when in filling engagement with the cap of a container;

Fig. 12 is a sectional view of the assembly of Fig. 11 showing the valve in its closed position when the assembly is out of filling engagement with the cap of the container;

Fig. 13 is a view along line 13—13 of Fig. 5;

Fig. 14 is a diagrammatic illustration of the liquid system for actuating the gasser; and Fig. 15 is a view along line 15—15 of Fig. 2.

As shown in the diagrammatic illustration of Fig. 1, the apparatus of the invention comprises several operating elements arranged in a compact integrated unit comprising a feed chute 1 through which the containers C travel to a transfer wheel 2, a container filler 3, a transfer wheel 4, a crowner 5, a transfer wheel 6, a gasser 7, a transfer wheel 8, and a delivery platform 9. The containers C, such as cans or bottles, are pushed through the feed chute by a chain or other suitable mechanism into contact with one of the pockets 12 in the transfer wheel 2 and are carried around the arcuate guide 13 and deposited upon the base plates 14 of the container filler. While on these plates, the liquid is introduced into the containers automatically in predetermined amounts by any suitable apparatus, such as apparatus of a type now widely used in the filling of milk bottles, beer cans, and the like. The containers are rotated clockwise and travel into pockets 15 of transfer wheel 4 which rotates in a counterclockwise direction and which carries the containers along the arcuate guide 16, placing them upon the base plates 17 of the crowner. The crowner is rotated in a clockwise direction, and while the containers are being conveyed in the crowner, they are each provided with a crown or cap by any suitable machine of the type now commonly used for automatically placing the crowns or caps on beer bottles. The capped containers move into engagement with the pockets 20 of transfer wheel 6 which rotates counterclockwise and are moved along the arcuate guide 21 and deposited upon the platforms 22 of the gasser. The gasser rotates in a clockwise direction and the containers are deposited in the pockets 23 of transfer wheel 8 by means of which they are carried along the arcuate guideway 24 and are ultimately pushed out of the apparatus and onto the delivery platform 9 from which they are removed for packaging or the like. The motor 25, through a speed reduction mechanism 26, drives the container filler, crowner, gasser and transfer wheels by means of an interconnected gear system whereby they all operate in precise timed relation to effect the conveyance of the containers through the apparatus just described.

The gasser and its immediately connected operating elements are best illustrated in Figs. 2 to 14. The rigid non-rotatable structure 29 (Figs. 2 and 3) rests upon the legs 30 and supports the gasser. The structure 29 has attached thereto the fixed annular bearing 31 which supports an interior bearing member 32 on the spokes or spider 33. The annular turntable 35 makes bearing contact at 31' with the upper surface of the fixed bearing member 31 and is rotated by means of the ring gear 36. The turntable 35 has a depending hub 37 which makes exterior bearing contact with the bearing member 32 and interior bearing contact with the bearing member 38 on the annular shaft 39 which is integral with a cam head 40. The cam head has an annular bearing surface 41 by means of which it is rotatably supported upon the bearing disc 42 on the interior of the turntable 35. The cam head has an undulating cam race 43, preferably having a sinusoidal shape for engaging platform actuating cam rollers.

The reduction gear 26, as best shown in Fig. 15, comprises an epicyclic gear train by means of which the drive shaft 45 is driven at reduced speed. The beveled gear 46 (see Figs. 2 and 3) connected to shaft 45 drives the right angle bevel gear 47 which is keyed to the central shaft 48 and to the annular shaft 39 and both shafts are accordingly driven in the same direction and at the same speed. The bevel gear 50, keyed to the shaft 45, drives the right angle bevel gear 51 keyed to the upright shaft 52 which, at its upper end, drives directly the transfer wheel 8. The shaft 52 is supported in the bearings 53 and 54 and has keyed thereto the spur gear 55 which drives the ring gear 36 and thereby the turntable 35 is rotated in a clockwise direction while the cam head 40 is rotated in a counterclockwise direction and at a much greater rate of speed.

As best shown in Figs. 1, 4, 5 and 6, the container-supporting platforms 22 are circumferentially spaced on the turntable 35 and each has mounted thereon a wear plate 57 which makes direct contact with the containers. Each platform (Figs. 3, 5 and 6) is connected to a base plate 58 which is in turn connected to, and supported upon a cylinder 60 having an interior bearing surface in close fitting engagement with the fluid tight gland 61 securely attached to the top of the annular upright arm 62 integral with the turntable 35. The gland 61 is secured to the arm 62 by means of bolts 63 and has a resilient annular bearing ring or washer 64 preferably formed of rubber, leather or the like, held in position between the annular plates 65 and 66. The cylindrical space inside cylinder 60 is for the introduction of an operating liquid later described.

The cylinder 60 has a laterally projecting bearing bracket 67 to which is connected by means of the bolt 68 the cam roller 70. The cam roller 70 makes contact with the cam race 43, as best shown in Fig. 5, and as the cam head rotates, the cam rollers follow the undulating surface and the container supporting platform 22 is reciprocated rapidly in an upward and downward straight line motion determined by the distance A between the troughs and crests of the cam race. The base plate 58 has a central depending annular flange 59 to which is attached the splined shaft 80 having longitudinal grooves 81 and 82 which slide over the fixed keys 83 and 84 attached by screws 85 to the sleeve 86 mounted in the arm 62 and secured thereto by the set screw 87. The lower end of the shaft 80 has a cylindrical head 88 which makes bearing contact in the cylinder 89 and which strikes the lower end of sleeve 86, limiting the upward movement of platform 22, as will be described more fully hereafter. The platform 22 is, accordingly, prevented from rotating and is guided in its reciprocable motion.

The platform 22 has an upright bracket 90 carrying at its upper end a bearing head 91 having an interior upright cylinder in which is mounted an annular slide 92 forming with the cylinder an annular space 93 in which is mounted a compression spring 94 which normally presses against a shoulder 95 of the slide urging it in a downward direction. The slide 92 projects through the head and has at its upper end a threaded exterior on which is screwed the stop nut 96 which limits the downward movement of the slide. The slide has a central cylindrical bore in which is slidably mounted the hollow shaft 97 having a duct 98, the lower end of which carries a valve-controlled gas-filling assembly 100. The shaft 97 is fixed to the slide 92 by the split washer 99 (Fig. 13). As best shown in Figs. 2 and 3, each of the shafts 97 is connected by means of a U-shaped coupling 102 to the flexible hose 103 which attaches to a gas manifold 104 on to the upper end of the shaft 48.

The assembly 100 (Figs. 11 and 12) comprises a head 105 threaded into the enlarged lower end of the shaft 97 and the two elements are in engagement with the gasket 106 forming a gastight joint. The valve member 107 has a valve seat 108 which reciprocates in the cylinder 109 of the head which is in communicating connection with the duct 98 in the shaft 97. In order to provide a passage for the flow of gas around the valve seat, the grooves 113 (Fig. 9) are formed in the sides of the cylinder 109. The valve seat 108 makes seating contact with the rubber valve seat 114 which is mounted in a recess in the head 105. The lower end of the valve member 107 has connected thereto by threads a spider 115 having a plurality of depending lugs 116 (Fig. 10) with spaces therebetween for the flow of gas thereunder, as shown by the arrows. The lower end portion of the head 105 has a cylindrical recess 117 in which is mounted the annular rubber sealing member 118. When the gas-filling assembly 100 is not in contact with a container, as shown in Fig. 12, the valve member 107 is pushed by the gas pressure to its closed position with the seat 108 in contact with the seat 114 and the gas is accordingly prevented from flowing therethrough.

When the gas-filling assembly 100 is pressed downwardly to a position with the rubber sealing member 118 in pressing engagement with the cap or crown 120 of the container C, as shown in Fig. 1, then the depending legs 116 raise the valve member 107 upwardly so that the gas is free to flow between valve seats 108 and 114 and follow the paths shown by the arrows.

The shaft 48 rotates at the same speed as the cam race 43 and at its upper end it has a bearing 125 (Fig. 3) held in a fixed position with respect to the turntable 35 by means of the radial arms 126 and 127 attached by blocks 128 to the upright supporting rods 129 and 130 fixed in rigid relation to the turntable 35. The manifold 104 is attached to the bearing 125 and rotates therewith and also at the same rate of speed as the turntable 35. The pipe 132 which connects to any suitable source of gas under pressure (not shown) passes through the stuffing box 133 which provides a gas-tight bearing joint for connecting the pipe to the gas manifold.

The bracket 90 has a slot 135 (Figs. 5 and 6) in which the lever 136 is pivotally mounted on the pin 137. One end of the lever is bifurcated (Fig. 3) having two bearing lugs 138 and 139 (Fig. 8) in continuous pressing engagement with the under surface of the slide 92. As shown in Fig. 5, the spring 94 normally pushes the gas assembly 100 into engagement with the cap 120 of the container. When the platform 22 is raised to the position shown in Fig. 6, the left end of the lever 136 bears against the block 128 and the slide 92 is pressed upwardly, thereby raising the gas assembly 100 out of contact with the crown of the container as shown in Figs. 6 and 12.

The platforms 22 occupy two distinct positions, namely, a lower position in which the cam rollers 70 are in engagement with the cam race 43 and during which time they are reciprocated through the distance A while the gas-filling assembly 100 is in contact with the cap and an upper position, the distance B above the upper limit of reciprocation, while in the lower position. In the upper position, the gas-filling assembly is not in contact with the cap (Figs. 6 and 12), and since the cam rollers 70 are out of contact with the cam race 43, there is no reciprocating movement of the platforms 22. Figs. 3 and 5 show two grooves 145 and 146 in the bearing surface 31' and an upright duct 147 connecting the groove to the space in cylinder 60 (Figs. 5 and 6).

The groove 145 has a pipe 148 connecting to an oil sump or to the intake side of an oil pump (not shown) and groove 146 has a pipe 149 connected to the high pressure or delivery side of the pump and the groove 145 is under zero pressure while groove 146 is always supplied with oil under pressure. This oil may be supplied by the oil lubricating pump.

Fig. 14 illustrates somewhat diagrammatically the arrangement of these grooves 145 and 146 and the ducts 147. Groove 146 occupies a position opposite the loading and unloading section of the gasser. When a particular duct 147 comes into coincident engagement with duct 146, oil rushes through the duct and into cylinder 60, the pressure thereof raising the platform 22 to the position shown in Fig. 6. The platforms in the loading and unloading positions are, accordingly, elevated the distance B above the highest point raised by the cam race. The gas-filling assemblies 100 are elevated to the positions shown in Fig. 6 out of engagement with the caps by the levers 136 striking block 128 which causes the lugs 138 and 139 to push the slide 92 upward. When ducts 147 move into coincident engagement with the groove 145, the oil drains out of cylinder 60 to the sump or intake of the oil pump and the platform falls to the lower position with the cam rollers in engagement with the cam race 43, at which time the assembly is in gas-filling engagement with the container caps. During that portion of the circular travel of the containers over groove 145, the containers are agitated, and when they are over groove 146, they are prevented from agitation.

It will be apparent from Figs. 2, 3 and 4 that the unit portion of filling and agitating apparatus illustrated in detail in Figs. 5 and 6 is similar for each of the platforms on which a container is supported during the gas filling and agitating of the liquid and that they are all identical.

In employing the apparatus of the invention, for example in filling tin cans with cream charged with nitrous oxide gas, the cans are fed into the chute 1 from which they are passed through the container filler, as previously described, and filled with a predetermined quantity of cream. Usually, an appreciable space is provided in the container for gas. The cream filled containers are each fitted with a valve and transferred to the crowner where each container is provided with a crown. The invention is particularly advantageous for the filling of containers having crowns attached thereto in the crowner which have a valve-controlled passageway which is opened by the pressure of gas exteriorly imposed thereon and which automatically closes when the exterior pressure is removed, thereby sealing the gas in the container. An especially satisfactory type of crown for this purpose is described in United States Patent No. 2,383,522. The crowned containers are transferred one at a time from the crowner and centrally positioned on one of the platforms 22. While in position on the platform 22, the containers are subjected to the agitation previously described.

I claim:

1. In an apparatus for filling containers with a liquid and charging gas therein with accompanying agitation of the liquid, the improvement which comprises a plurality of platforms for supporting a plurality of containers, means for placing each container of liquid on its platform in a continuous operation, means for progressively moving the platforms and their containers through a definite path of travel, means for introducing a gas into the containers while on the platforms, a rotatable cam head provided with an undulating cam race adjacent to and separate from the platforms, a cam roller supported by each platform, the cam rollers being in engagement with the cam race so that when the platforms move along their path of travel both the platforms and containers are moved up and down to agitate the liquid while it is being charged with gas.

2. In an apparatus for filling containers with a liquid and charging gas therein with accompanying agitation of the liquid, the improvement which comprises a plurality of platforms for supporting a plurality of containers thereon, means for progressively moving the platforms and their supported containers through a definite path of travel, means for introducing a gas into the containers while on the platforms, an undulating cam race adjacent the path of travel, cam means for each platform for engaging the cam race to move the platforms and containers in up and down movement to agitate the liquid while it is being charged with gas, and means for automatically connecting the gas means to the container while on its platform and then engaging the cam means with the cam race, said latter means also disconnecting the gas means from the containers and removing the cam means from the cam race to stop the agitation preparatory to removing the containers from their platforms.

3. In an apparatus for filling containers with a liquid and charging gas therein with accompanying agitation of the liquid, the improvement which comprises a plurality of platforms for supporting a plurality of containers thereon, means for progressively moving the platforms and their supported containers through a circular path of travel, gas means for introducing gas into the containers, an undulating cam race near the path of travel, cam means for each platform to engage the cam race and effect an up and down movement to agitate the liquid, means for connecting the gas means to the containers and for starting the up and down movement a short interval after the container is placed on its platform, means for disconnecting the gas means from the container and stopping the up and down movement when the liquid has absorbed its required amount of gas, and means for removing the containers from their platforms.

4. In an apparatus for filling containers with a liquid and charging gas therein with accompanying agitation of the liquid, the improvement which comprises a plurality of circumferentially spaced container platforms mounted to travel an arcuate path from a loading position to a delivery position, cam means for each platform arranged to effect an up and down movement for each platform, means for holding the platforms out of contact with the cam means while loading the containers of liquid thereon, gas charging means for each container, means for connecting the gas charging means to each container shortly after it is loaded on its platform, valve means associated with the gas charging means which automatically open on engaging the containers to admit gas to the containers, means for moving the platforms in contact with the cam means to effect the up and down agitation while the gas is being charged into the containers, and means for removing the platforms out of contact with the cam means and disconnecting the gas charging means from the containers after the required amount of gas has been absorbed by the liquid at the delivery position.

5. In an apparatus for filling containers with a liquid and charging gas therein with accompanying agitation of the liquid, the improvement which comprises a plurality of platforms for supporting a plurality of containers thereon, means for progressively moving the platforms and their supported containers through a definite path of travel, means for introducing a gas into the containers while on the platforms, a rotatable cam head provided with an undulating cam race adjacent to and separate from the platforms, a cam roller supported by each platform, the cam rollers being in engagement with the cam race so that when the platforms move along their path of travel both the platforms and containers are moved up and down to agitate the liquid while it is being charged with gas.

CHARLES D. THOMS.

REFERENCES CITED

The following references are of record in the file of this patent:

UNITED STATES PATENTS

| Number | Name | Date |
| --- | --- | --- |
| 2,140,187 | Kantor | Dec. 13, 1938 |
| 2,383,522 | Thoms | Aug. 28, 1945 |
| 2,415,528 | Peebles et al. | Feb. 11, 1947 |

Certificate of Correction

Patent No. 2,478,212                                       August 9, 1949

CHARLES D. THOMS

It is hereby certified that errors appear in the printed specification of the above numbered patent requiring correction as follows:

Column 5, line 4, for "Fig. 1," read *Fig. 11,*; line 25, for "(Fig. 3)" read *(Fig. 8)*; line 56, before "pump" insert *oil*;

and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*